3,361,589
PROCESS FOR TREATING POLYIMIDE SURFACE WITH BASIC COMPOUNDS, AND POLYIMIDE SURFACE HAVING THIN LAYER OF POLYAMIDE ACID
William Bryan Lindsey, Tonawanda, N.Y., assignor to E. I. du Pont de Nemours and Company, Wilmington, Del., a corporation of Delaware
No Drawing. Filed Nov. 13, 1964, Ser. No. 411,126
6 Claims. (Cl. 117—118)

This application is a continuation-in-part of my co-pending application Ser. No. 401,658 filed Oct. 5, 1964, now abandoned.

This invention relates to polyimides and more particularly to the treatment of a polyimide surface for improvement of receptivity and adherence to adhesives.

Many commercial adhesives do not bond well to polyimide surfaces. Even organic solvent solutions of the precursor polyamide-acids do not form as good bonds with polyimide surfaces as desired for many uses. Some adhesives adhere well but are not sufficiently stable thermally to be useful for making laminates of this new thermally-stable polymer. Most polyimides are so insoluble in most solvents that it has not been possible to improve the receptivity to adhesives by a surface solvent treatment.

According to the present invention, a solution of a basic compound is applied as a surface treatment to the polyimide to obtain improved receptivity and adherence of the surface to adhesives.

The basic compound can be the following: a carbonate, hydroxide, cyanide, borate, phosphate, pyrophosphate, sulfite, sulfide or silicate of an alkali metal including sodium, potassium, lithium, rubidium and cesium, a carbonate, hydroxide, cyanide, borate or sulfide of ammonia; an alkoxide of an alkali metal; and quaternary ammonium hydroxides.

The basic compounds can be used in anhydrous form or in the form of any convenient hydrate as will be readily understood and as illustrated below.

The alkoxides referred to will generally have from 1 through 12 carbons in the alkylate portion.

The quaternary ammonium hydroxides have the formula

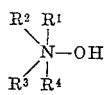

where $R^1$ and $R^2$ are the same or different alkyl radicals of 1 through 4 carbons; $R^3$ is alkyl of 1 through 18 carbons or alkenyl of 1 through 18 carbons; and $R^4$ is alkyl of 1 through 18 carbons, alkenyl of 1 through 18 carbons, phenyl, alkylphenyl where the alkyl portion has 1 through 18 carbons, benzyl or alkylbenzyl where the alkyl portion has 1 through 18 carbons.

Representative quaternary ammonium hydroxides useful according to the present invention are the following:

tetramethyl ammonium hydroxide
tetraethyl ammonium hydroxide
tetrabutyl ammonium hydroxide
benzyl trimethyl ammonium hydroxide
phenyl trimethyl ammonium hydroxide
dodecyl trimethyl ammonium hydroxide
hexadecyl trimethyl ammonium hydroxide
octadecyl trimethyl ammonium hydroxide
dodecyl triethyl ammonium hydroxide
hexadecyl triethyl ammonium hydroxide
octadecyl triethyl ammonium hydroxide
dodecyl tri-n-propyl ammonium hydroxide
dodecyl tri-isopropyl ammonium hydroxide
benzyl dimethyl hexadecyl ammonium hydroxide
dimethyl ethyl hexadecyl ammonium hydroxide
p-dodecylbenzyl trimethyl ammonium hydroxide
benzyl dimethyl octadecyl ammonium hydroxide Commercially available products containing mixtures of two or more quaternary ammonium hydroxides, usually of higher alkyl and/or alkenyl substituents are particularly useful. Representative of such mixtures are the following wherein only the alkyl or alkenyl substituents are noted and the percent by weight of each component is also given: (1) 90% dodecyl, 9% tetradecyl and 1% octadecenyl; (2) 90% tetradecyl, 4% dodecyl, 4% hexadecyl and 2% octadecenyl; (3) 90% hexadecyl, 6% octadecyl and 4% octadecenyl; (4) 93% octadecyl, 6% hexadecyl and 1% octadecenyl; and (5) 47% dodecyl, 18% tetradecyl, 9% decyl, 8% octyl, 8% hexadecyl, 5% octadecyl, 3% octadecenyl and 2% octadecadienyl.

Preferred bases for this invention are sodium hydroxide, potassium hydroxide, lithium hydroxide and ammonium hydroxide.

The basic treating agent in the practice of this invention is applied in a solution, preferably in water and/or an alcohol, to the surface of the polyimide. The solution for the basic compounds such as referred to above generally will be aqueous and will have a pH of at least about 10. Alcoholic solutions of the alkali metal alkoxides, such as sodium dodecoxide (sodium dodecylate), in lower alcohols, such as alkanols of 1 through 4 carbons, e.g., methanol, ethanol, etc., are satisfactory. The concentration of the solution can be from about 5 to 30% by weight of the basic treating agent.

Duration of treatment can vary from as short as half a minute or so up to half an hour or longer and temperatures in the range of about 20 to 100° C. are usable. Selection of the particular concentration, duration and temperature to be used for any given basic treating agent and any given polyimide will be interdependent and readily determinable by persons skilled in the art.

Treatment generally will be sufficient to provide on the polyimide surface free carboxyl groups in an amount that can be detected by potentiometric titration with a weak alkali. No more is needed than an amount sufficient to wet the surface to be treated or, in other words, an amount sufficient to obtain a surface which can be wetted uniformly by water. The resultant treated surface has an extremely thin surface coating of the sodium salt of the polyamide-acid corresponding to the polyimide being treated. The sodium salt can be converted to the polyamide-acid by treatment with a mineral acid. The sodium salt of the polyamide-acid as well as the polyamide-acid have improved adherability. The polyamide-acid as mentioned above is of sufficient amount to be detectable by titration with a strong alkali, but insufficient to be detectable by feel or by single reflection attenuated total reflectance infrared spectroscopy using an optical prism in contact with the treated surface, the prism having an index of refraction below about 2.6. A suitable prism is available commercially and is the KRS-5 prism of mixed 48% by weight thallium bromide and 52% by weight thallium iodide (Harshaw Chemical Co.).

Following treatment according to this invention using relatively moderate conditions, i.e. dilute treating solution, short time and/or low temperature, no visible change will be seen in the treated surface even though there definitely is a measurable improvement in adherability. On the other hand, with increasing severity of treatment, i.e. more concentrated treating solution, longer time and/or higher temperature, the treated surface may lose its glossiness and acquire the appearance of having been sanded. The treatment does not to any significant extent adversely affect the outstanding physical properties of the material such as the tensile strength, modulus, elongation, impact strength, tear strength, and the like.

The treatment modifies and improves the polarity of the treated surface. Average contact angle (theta) is a measure of the modification of polarity of the surface and is an average of the advancing and receding contact angles measured with deionized water droplets. Before treatment the average contact angle (theta) of the polyimide surface is on the order of 55–60° or higher. After treatment the average contact angle (theta) of the surface is 50° or lower. In measuring contact angles a microscope is focused horizontally on the surface of a deionized water droplet at its point of contact with the polyimide surface. The angle of contact is read on a scale, first as the droplet is pushed out from a very fine dropper onto the surface, and then as the droplet is pulled back into the dropper. These are the advancing and receding contact angles, respectively.

Although it is not intended to be bound or limited by any theory of operation, it is possible that the treatment of this invention serves to hydrolyze some imide rings of the polyimide surface to amide linkages without severing these amide linkages and without dissolving any measurable amount of the polyimide.

Any part of a polyimide article—e.g., either one or more surfaces of the article such as a film, sheet, fiber, tubing, molded article, etc. can be treated in the manner of this invention.

The polyimide which can usefully be treated according to the present invention is any polyimide of a polyamide-acid having the formula

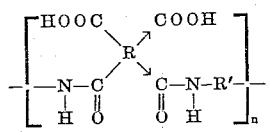

where the arrows denote isomerism; R is an organic tetravalent radical containing at least 2 carbon atoms, no more than 2 carbonyl groups of each polyamide-acid unit being attached to any one carbon atom of said tetravalent radical; R' is a divalent radical containing at least 2 carbon atoms, the amide groups of adjacent polyamide-acid units each attached to separate carbon atoms of said divalent radical; and $n$ is a positive integer sufficient to provide said polyamide-acid with an inherent viscosity of at least 0.1.

These polyimides and their preparation are fully described in Edwards U.S. patent application Ser. No. 95,014 filed Mar. 13, 1961, now Patent No. 3,179,614, assigned to the same assignee as that of the present invention. The disclosure of the Edwards application is hereby incorporated by reference in its entirety.

As described by Edwards, the polyamide-acids can be prepared from organic diamines and tetracarboxylic acid dianhydrides.

The organic diamines have the formula $$H_2N—R'—NH_2$$

where R', the divalent radical, is selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The most useful diamines are primary diamines. Although secondary diamines such as piperazine can be used, only the primary diamines, upon reaction with the dianhydrides, provide polyamide-acids which after shaping can be converted into the polyimides. The preferred R' groups in the diamines are those containing at least six carbon atoms characterized by benzenoid unsaturation, i.e. alternate double bonds in a ring structure.

Representative diamines are the following:

meta-phenylene diamines;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
bis-(4-amino-phenyl)diethyl silane;
bis-(4-amino-phenyl)phosphine oxide;
bis-(4-amino-phenyl)-N-methylamine;
1,5-diamino-naphthalene;
3,3'-dimethyl-4,4'-diamino-biphenyl;
3,3'-dimethoxy benzidine;
2,4-bis(beta-amino-t-butyl)toluene;
bis-(para-beta-amino-t-butyl-phenyl) ether;
para-bis-(2-methyl-4-amino-pentyl)benzene;
para-bis-(1,1-dimethyl-5-amino-pentyl)benzene;
m-xylylene diamine;
p-xylylene diamine;
bis(para-amino-cyclohexyl)methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cycolhexane;
1,12-diamino-octadecane;

$$H_2N(CH_2)_3O(CH_2)_2O(CH_2)_3NH_2:$$
$$H_2N(CH_2)_3S(CH_2)_3NH_2$$
$$H_2N(CH_2)_3N(CH_3)(CH_2)_3NH_2$$

and mixtures thereof.

The tetracarboxylic acid dianhydrides have the formula

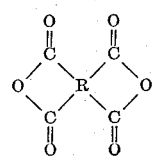

where R is a tetravalent organic radical selected from the group consisting of aromatic, aliphatic, cycloaliphatic, heterocyclic, combination of aromatic and aliphatic, and substituted groups thereof. The preferred dianhydrides are those in which the R groups have at least 6 carbon atoms characterized by benzenoid unsaturation, i.e. alternate double bonds in a ring structure, where the 4 carbonyl groups of the dianhydride are each attached to separate carbon atoms and where each pair of carbonyl groups is directly attached to adjacent carbon atoms in the R group to provide a 5-membered ring as follows:

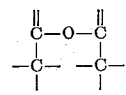

Representative tetracarboxylic acid dianhydrides are the following: pyromellitic dianhydride; 2,3,6,7-naphthalene tetracarboxylic dianhydride, 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl) propane dianhydride; 3,4-dicarboxyphenyl sulfone dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; etc.

Inherent viscosity as is known in the art is directly related to polymer molecular weight. It is measured at 30° C. at a concentration of 0.5% by weight of the polymer in a suitable solvent. The viscosity is measured relative to that of the solvent alone and the inherent viscosity equals $$\text{natural logarithm } \frac{\frac{\text{Viscosity of solution}}{\text{Viscosity of solvent}}}{C}$$

where C is the concentration expressed in grams of polymer per 100 milliliters of solution.

The polyimides having been given the adhesion-promoting surface treatment according to the present invention are rendered far more useful than untreated polyimides for the manufacture of spiral-wound tubing, printed electrical circuits and other laminates.

The invention will be more clearly understood by referring to the examples which follow. These examples, which illustrate specific embodiments of the present invention, should not be construed to limit the invention in any way.

Example 1

A film about 2.8 mils in thickness, composed of the polyimide made from pyromellitic dianhydride and bis(4-aminophenyl) ether, was soaked at room temperature for 5 minutes in a 10% by weight solution of potassium hydroxide in methanol. The film was then washed with water, with 10% hydrochloric acid, and finally with distilled water and dried. Two strips of this film, each one-half inch wide, were then bonded together using between them as adhesive a layer of a 15% by weight solution in N,N-dimethylacetamide of the polyamide-acid made from the dianhydride and diamine of this example. This laminate was heated under pressure for one hour at 100° C., for another hour at 200° C. and for a third hour at 300° C. When a 3-inch long strip of this laminate was pulled on a Suter tester, a peel strength of 1700 grams/inch was obtained, compared with a value of less than 100 grams/inch for a similar laminate made in exactly the same way except that the soaking in methanolic potassium hydroxide and subsequent washing steps were omitted.

A second control on this experiment involved the use of N,N-dimethylacetamide alone instead of a solution of the polyamide-acid in it. In this case the peel strength was 130 grams/inch.

Example 2

The procedure of Example 1 was repeated, using instead of the potassium hydroxide solution a 5% by weight solution of sodium methoxide in methanol. After washing, drying, applying the polyamide-acid adhesive and heating under the conditions given in Example 1, a laminate of 630 grams/inch peel strength was obtained.

Example 3

A 2.8 mil film of the bis(4-aminophenyl) ether polypyromellitimide was soaked for 10 minutes at 50° C. in a 10% by weight aqueous solution of sodium hydroxide, and then washed sequentially with water, dilute 10% by weight aqueous hydrochloric acid and water, and then finally dried. Using as adhesive a 15% by weight solution in N,N-dimethylacetamide of the polyamide-acid of pyromellitic dianhydride and 4,4'-diamino-diphenyl ether, two strips of this treated film were bonded together by pressing them between two metal plates. They were heated for one hour at 100° C. and for a second hour at 200° C. The Suter peel strength of the bond was about 1,000 grams/inch.

Example 4

A poly bis(4-aminophenyl) ether pyromellitimide film of 3 mils in thickness was treated on one side for 10 minutes at 30° C. with a 10% by weight aqueous sodium hydroxide solution. The film was washed with dilute 10% by weight aqueous hydrochloric acid and then water, followed by drying. An adhesive was prepared by dissolving 10 grams of an epoxy resin sold as Dow D.E.N. 438, 1.8 gram of maleic anhydride in enough acetone to dissolve these ingredients completely. This adhesive was painted onto the treated sides of two pieces of this film, and as controls onto the untreated sides of two other pieces. These pairs of pieces were then laminated together by heating for 1 hour at 150° C. The Suter peel strengths were as follows:

| | Grams/inch |
|---|---|
| Treated to treated—About | 3,100 |
| Untreated to untreated | <200 |

Example 5

The samples of film of 2.0 mils in thickness composed of the polyimide made of pyromellitic dianhydride and bis(4-aminophenyl) ether were treated for 5 and 10 minutes respectively at 45° C. in a 10% by weight aqueous sodium hydroxide solution. The film samples were washed successively in water, dilute 10% by weight aqueous hydrochloric acid and then water before drying. These treated film samples were laminated to themselves using an adhesive made of 20 grams of an epoxy resin sold as Dow D.E.N. 438, 1.8 gram of pyromellitic dianhydride and 3.2 grams of maleic anhydride and enough acetone to dissolve all three components. This solution was painted onto the treated surfaces of the polyimide film and the acetone evaporated at room temperature. The coated surfaces were then placed together and pressed for one hour at 150° C., and finally another hour at 200° C. to obtain bonds of outstanding strengths.

Example 6

Two samples of untreated polimide film of Example 1 were immersed for 1 and 2 minutes respectively in sodium hydroxide solutions by weight in water at the concentrations shown below, followed by observation of the tendency of water to form a continuous film on the washed film surface. Continuous wetting has been observed to be a good measure of the adequacy of the treatment according to the present invention.

| Percent NaOH | Time at Room Temperature (26° C.) | | |
|---|---|---|---|
| | 0 minute | 1 minute | 2 minutes |
| 0.5 | Did not wet surface.[1] | 75% of surface wet. | 100% of surface wet. |
| 1.0 | ----do-------- | 90% of surface wet. | Do. |
| 2.0 | ----do-------- | 100% of surface wet. | Do. |
| 5.0 | ----do-------- | ----do-------- | Do. |
| 10.0 | ----do-------- | ----do-------- | Do. |
| 20.0 | ----do-------- | ----do-------- | Do. |
| 40.0 | ----do-------- | ----do-------- | Do. |

[1] Less than 10% of surface wet.

These data show that the action of aqueous sodium hydroxide on the surface of a polyimide film is very rapid even at room temperature.

Example 7

Weighed samples of the polyimide film of Example 1 (but only 1 mil thick) were immersed in aqueous sodium hydroxide solutions of the same concentrations described in Example 6 and left for varying periods of time at room temperature. After removal from the sodium hydroxide solutions, these films were washed with distilled water, dried and weighed. The percent losses in weight resulting from the treatment were as follows:

| Percent NaOH | Percent Erosion of Film Surfaces by NaOH Solutions at 26° C. Time (Minutes) | | | |
|---|---|---|---|---|
| | 1 | 2 | 5 | 10 |
| 0.5 | 3 | 1 | 6 | 1 |
| 1.0 | 6 | 5 | 3 | 3 |
| 2.0 | 4 | 5 | 7 | 1 |
| 5.0 | 0.2 | 6 | 1 | 3 |
| 10.0 | 1 | 2 | 2 | 4 |
| 20.0 | 3 | 3 | 14 | 8 |
| 40.0 | 13 | 2 | 11 | 11 |

These data indicate that 40% aqueous sodium hydroxide etches away large percentages of a polyimide film rapidly so that concentrations of this base higher than 20% must be used carefully.

Examples 8–10

When films of the following polyimides are substituted for the film of Example 1, using the same treating conditions, films having adherabilities comparable to the treated film of that example are obtained:

Example: Polyimide
- 8 --- m-Phenylenediamine polypyromellitimide.
- 9 --- Bis(4-aminophenyl) sulfone polypyromellitimide.
- 10 --- Bis(4-aminophenyl) methane polypyromellitimide.

Example 11

A sample of untreated film of Example 1 was immersed in 10% by weight aqueous sodium carbonate for 5 minutes at 45° C. followed by immersion for 10 minutes at 50° C. The treated film was readily wettable by water over the entire surface of the film with no balling up (formation of lumps) or other deleterious effect on the treated surface.

Example 12

A sample of untreated film of Example 1 was immersed in 10% by weight aqueous sodium pyrophosphate decahydrate for 5 minutes at 45° C., followed by 10 minutes at 50° C., followed by 10 minutes at 60° C. A continuous layer of water adhered to the treated film surface.

Example 13

A sample of untreated film of Example 1 was immersed in 10% by weight aqueous sodium sulfite heptahydrate for 5 minutes at 45° C., followed by 10 minutes at 55° C. to yield a film having a uniformly wet surface.

Example 14

A sample of untreated film of Example 1 was immersed in 10% by weight aqueous sodium sulfide monohydrate for 5 minutes at 45° C. to yield a film having a uniformly wet surface.

Example 15

A sample of untreated film of Example 1 was immersed in 10% by weight aqueous ammonium hydroxide for 1 minute at 45° C. to yield a film of greatly improved surface wettability. In addition the heat-sealability of the film was improved. After heat-sealing two such treated pieces together as in Example 3, the peel strength of the tearing seal was 1,020 grams/inch.

Example 16

A sample of untreated film of Example 1 was immersed in 10% by weight aqueous sodium silicate for five minutes at 45° C. to yield a film having a uniformly wet surface.

Example 17

A sample of untreated film of Example 1 was immersed in 10% by weight aqueous sodium phosphate dodecahydrate for 5 minutes at 45° C. to yield a film having a uniformly wet surface.

Example 18

After treatments of 1, 2, 5 and 10 minutes respectively according to Example 3, film samples showed the following results compared with an untreated control:

| Treating time: | Average contact angle (theta),° |
|---|---|
| 0 (control) | 55 |
| 1 | 32 |
| 2 | 24 |
| 5 | 33 |
| 10 | 34 |

Example 19

An untreated polyimide film of a chemical composition described in Example 1 was immersed in a solution of methyl triethyl ammonium hydroxide prepared from 270 milliliters of water, 41 milliliters of triethylamine and 70 milliliters of methanol. The film was kept in this solution at room temperature for only 3 minutes and was found to be wet uniformly over its entire surface.

Example 20

Small pieces of 1.7 mil film of the polyimide of Example 1 (12.23 grams total), surface-treated according to the procedure of Example 1, were stirred in 500 milliliters of water in a Waring Blendor while 0.1 N sodium bicarbonate was added from a microburette. The hydrogen ion concentration (pH) was measured after each addition of bicarbonate. The viscosity of the water increased constantly, and a break in the titration curve was observed at a point corresponding to 0.025 milliequivalent/meter$^2$. A similar titration carried out in the absence of treated film showed no such break.

Examples 21–26

When samples of the untreated polyimide film of Example 1 are immersed for 5 minutes at 45–50° C. in 10% by weight aqueous solutions of each of the following, the film surface is modified and permits uniform wetting by the aqueous treating solution:

| Example: | Treating agent |
|---|---|
| 21 | Sodium cyanide. |
| 22 | Sodium borate. |
| 23 | Ammonium cyanide. |
| 24 | Ammonium borate. |
| 25 | Ammonium carbonate. |
| 26 | Ammonium sulfide. |

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:
1. The process of improving the surface of an article of a polyimide of a polyamide-acid having the formula

$$\left[ \begin{array}{c} HOOC \quad\nearrow\quad COOH \\ \diagdown R \diagup \\ -N-C \qquad C-N-R'- \\ \;|\;\;\;\|\quad\;\;\;\|\;\;\;| \\ H\;\;O\qquad O\;\;H \end{array} \right]_n$$

where the arrows denote isomerism; R is an organic tetravalent radical containing at least 2 carbon atoms, no more than 2 carbonyl groups of each polyamide-acid unit being attached to any one carbon atom of said tetravalent radical; R' is a divalent radical containing at least 2 carbon atoms, the amide groups of adjacent polyamide-acid units each attached to separate carbon atoms of said divalent radical; and $n$ is a positive integer sufficient to provide said polyamide-acid with an inherent viscosity of at least 0.1; said process comprising applying to at least one surface of said polyimide article, in an amount and for a time sufficient to improve the receptivity and adherability of said surface to adhesives and at a temperature in the range of about 20 to 100° C., an aqueous solution of about 5 to 30% by weight of a basic compound selected from the group consisting of a carbonate, hydroxide, cyanide, borate, phosphate, pyrophosphate, sulfite, sulfide and silicate of an alkali metal; a carbonate, hydroxide, cyanide, borate and sulfide of ammonia; alkali metal alkoxides where the alkylate portion has 1 through 4 carbons; and a quaternary ammonium hydroxide of the formula

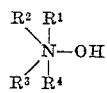

where $R^1$ and $R^2$ are each alkyl of 1–4 carbons; $R^3$ is selected from the group consisting of alkyl of 1–18 carbons and alkenyl of 1–18 carbons; and $R^4$ is selected from the group consisting of alkyl of 1–18 carbons, alkenyl of 1–18 carbons, phenyl, alkylphenyl where the alkyl portion has 1–18 carbons, benzyl and alkylbenzyl where the alkyl portion has 1–18 carbons.

2. The process as set forth in claim 1 wherein said solution is an aqueous solution of sodium hydroxide.

3. The process as set forth in claim 1 wherein said solution is an aqueous solution of potassium hydroxide.

4. The process as set forth in claim 1 wherein said solution is an aqueous solution of sodium methoxide.

5. The process as set forth in claim 1 wherein said solution is an aqueous solution of sodium carbonate.

6. A polyimide of a polyamide-acid having the formula

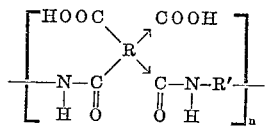

where the arrows denote isomerism; R is an organic tetravalent radical containing at least 2 carbon atoms, no more than 2 carbonyl groups of each polyamide-acid unit being attached to any one carbon atom of said tetravalent radical; R' is a divalent radical containing at least 2 carbon atoms, the amide groups of adjacent polyamide-acid units each attached to separate carbon atoms of said divalent radical; and $n$ is a positive integer sufficient to provide said polyamide-acid with an inherent viscosity of at least 0.1; said polyimide having on its surface a thin layer of polyamide-acid corresponding to the polyimide, said surface having an average contact angle of less than about 50°, the amount of polyamide-acid being sufficient to be detectable by titration with alkali but insufficient to be detectable by single reflection attenuated total reflectance infrared spectroscopy using an optical prism in contact with said surface, said prism having an index of refraction below about 2.6.

References Cited
UNITED STATES PATENTS

| | | | |
|---|---|---|---|
| 2,764,502 | 9/1956 | Emerson | 117—47 |
| 3,073,784 | 1/1963 | Endrey | 260—78 X |
| 3,179,634 | 4/1965 | Edwards | 117—138.8 X |

MURRAY KATZ, *Primary Examiner.*

J. E. MILLER, JR., *Assistant Examiner.*